US008503477B2

(12) United States Patent
Gottumukkala

(10) Patent No.: US 8,503,477 B2
(45) Date of Patent: Aug. 6, 2013

(54) 16E1/T1 MEDIA GATEWAY

(76) Inventor: NandaKishore Gottumukkala, Guntur (IN)

( * ) Notice: Subject to any disclaimer, the term of this patent is extended or adjusted under 35 U.S.C. 154(b) by 712 days.

(21) Appl. No.: 12/703,883

(22) Filed: Feb. 11, 2010

(65) Prior Publication Data
US 2011/0197252 A1 Aug. 11, 2011

(51) Int. Cl.
*H04J 3/16* (2006.01)
(52) U.S. Cl.
USPC .............................. 370/466; 370/401; 370/467
(58) Field of Classification Search
USPC .................. 370/230, 235, 352–357, 401, 466, 370/467; 709/227; 379/279
See application file for complete search history.

(56) References Cited

U.S. PATENT DOCUMENTS 6,510,163 B1 * 1/2003 Won ................................ 370/466
2002/0101860 A1 * 8/2002 Thornton et al. ............. 370/352

* cited by examiner

*Primary Examiner* — Dady Chery
(74) *Attorney, Agent, or Firm* — Lambert & Associates; Gary E. Lambert; David J. Connaughton, Jr.

(57) ABSTRACT

An apparatus, method and system of a 16E1/T1 media gateway are disclosed. In one embodiment, a 16E1/T1 media gateway includes two set of 8E1/T1 interfaces connected through RJ45 connectors to create 16 E1/T1 interface in a media gateway equipment to run a multiple applications simultaneously such as voice services such as voice dialers including OBD, IBD, CRBT, IVRS, and video services such as Video IVRS, Video dialing, 3G services, and Data services such as SMSC, USSD, SIP terminal, and other special services like WAP, LBS services, remote monitoring, GSM A interface value added services in a single hardware based solution. Each 8E1/T1 setup consists of a CPU board, a framer board, a DSP board, HDD, power supply unit with dual power inputs, LED board, fans, to provide above said services.

8 Claims, 12 Drawing Sheets

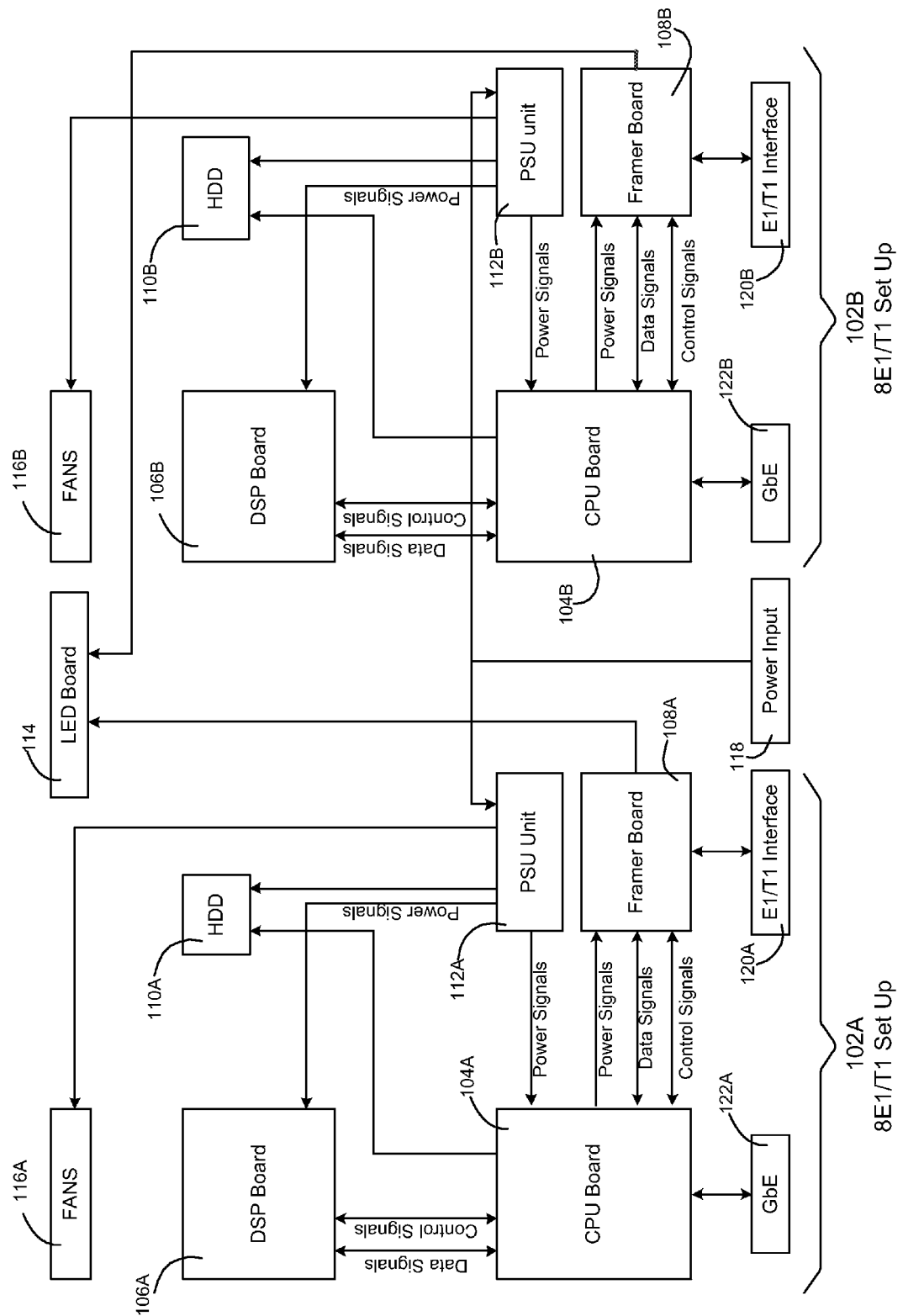
FIG 1 : 16E1/T1 Media Gateway Equipment - 100

REAR PANEL

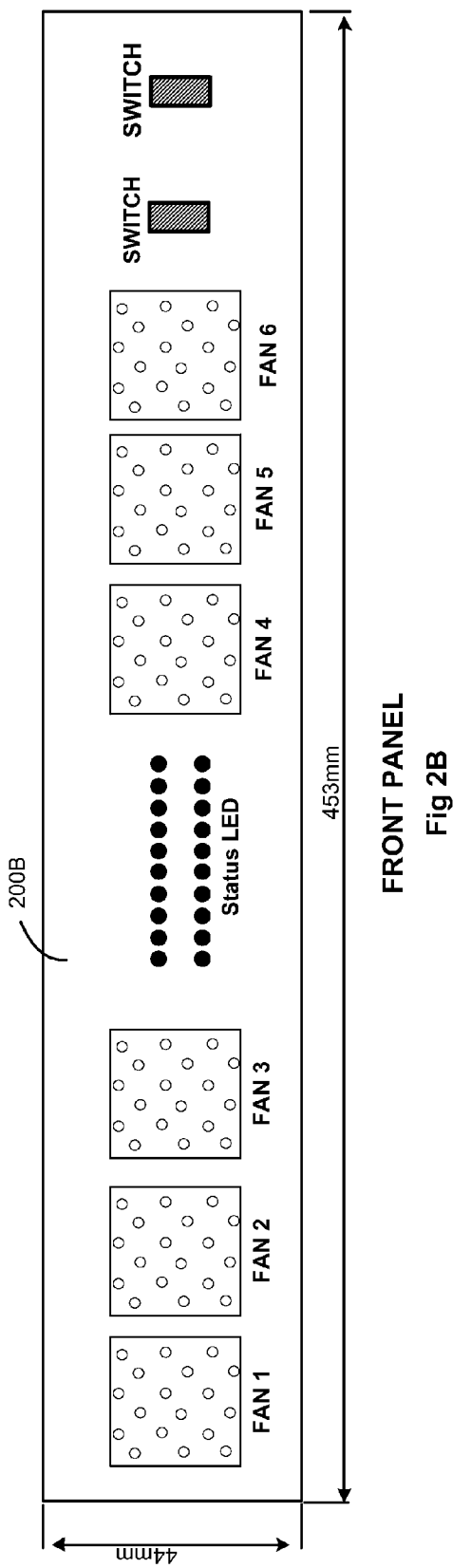

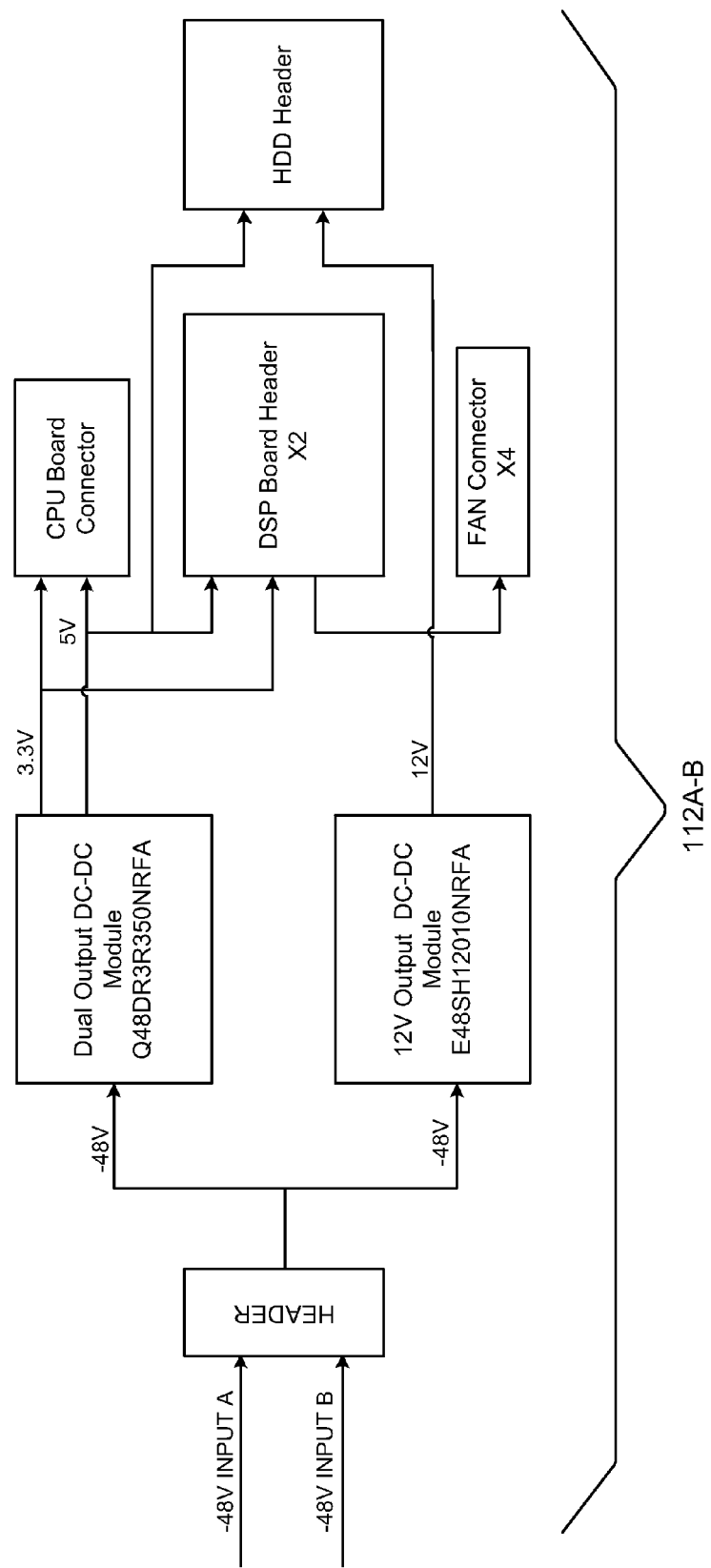
Fig : 3 - Power supply unit(PSU)

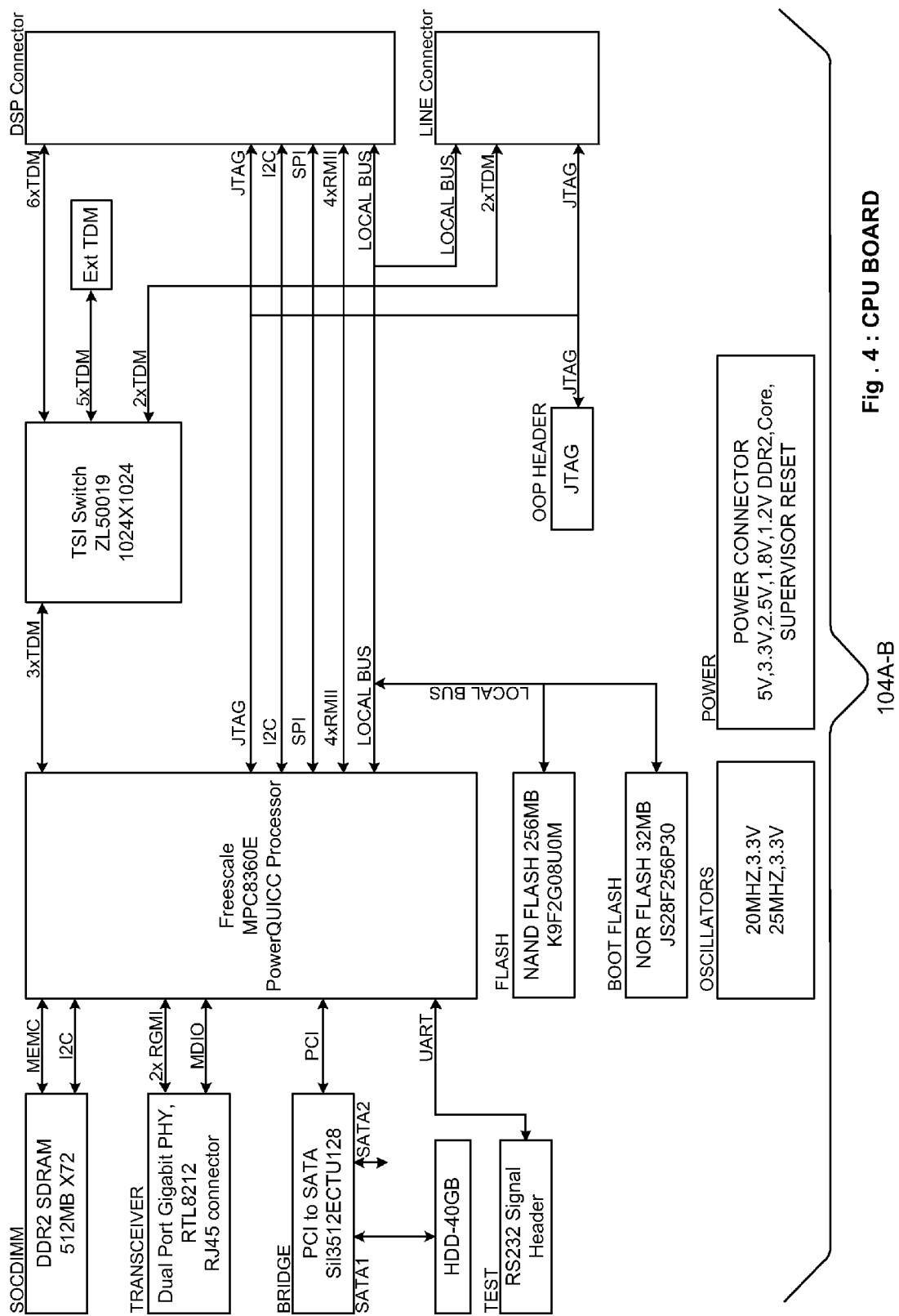
Fig. 4 : CPU BOARD

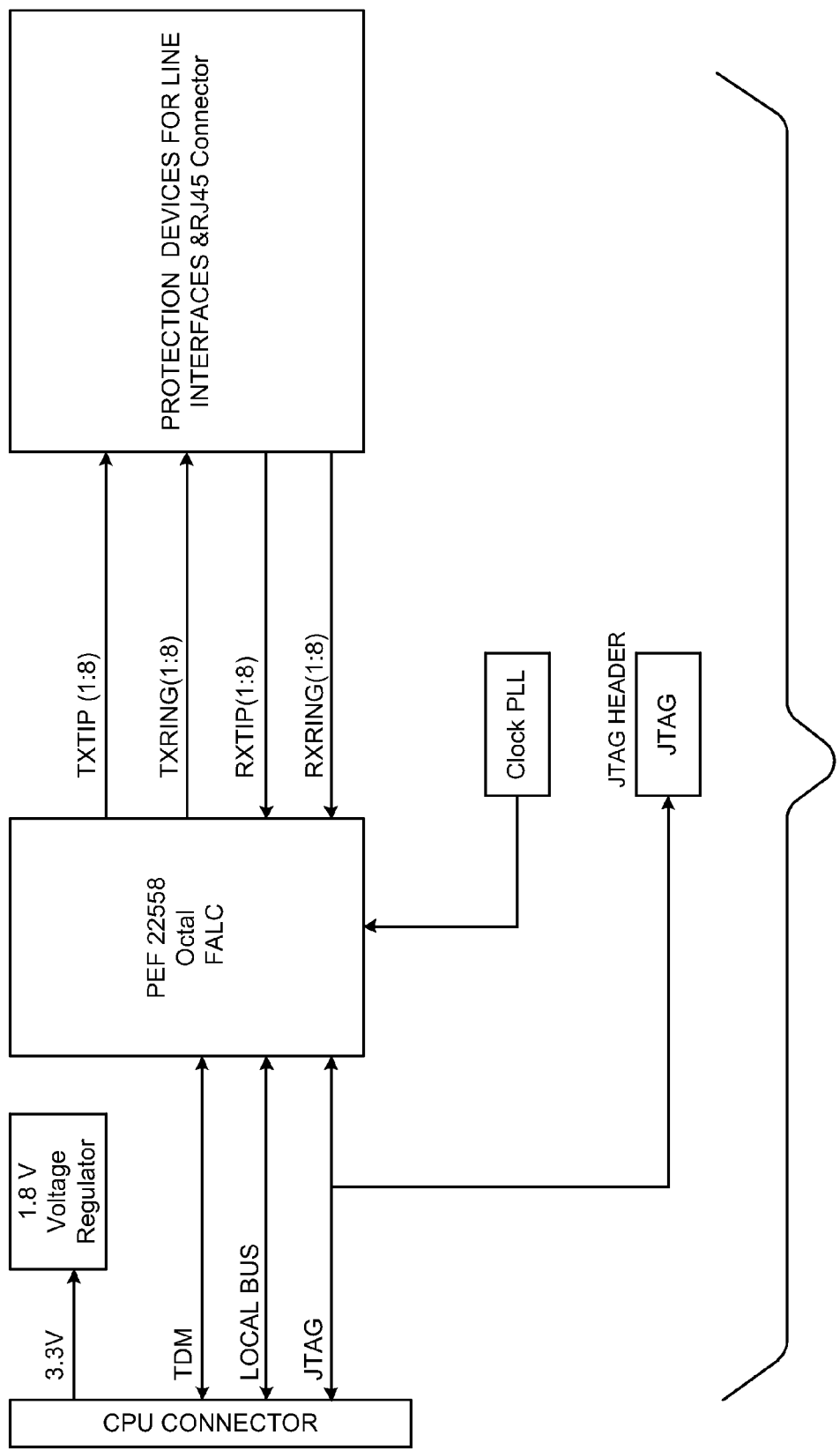
Fig. 5 : FRAMER BOARD

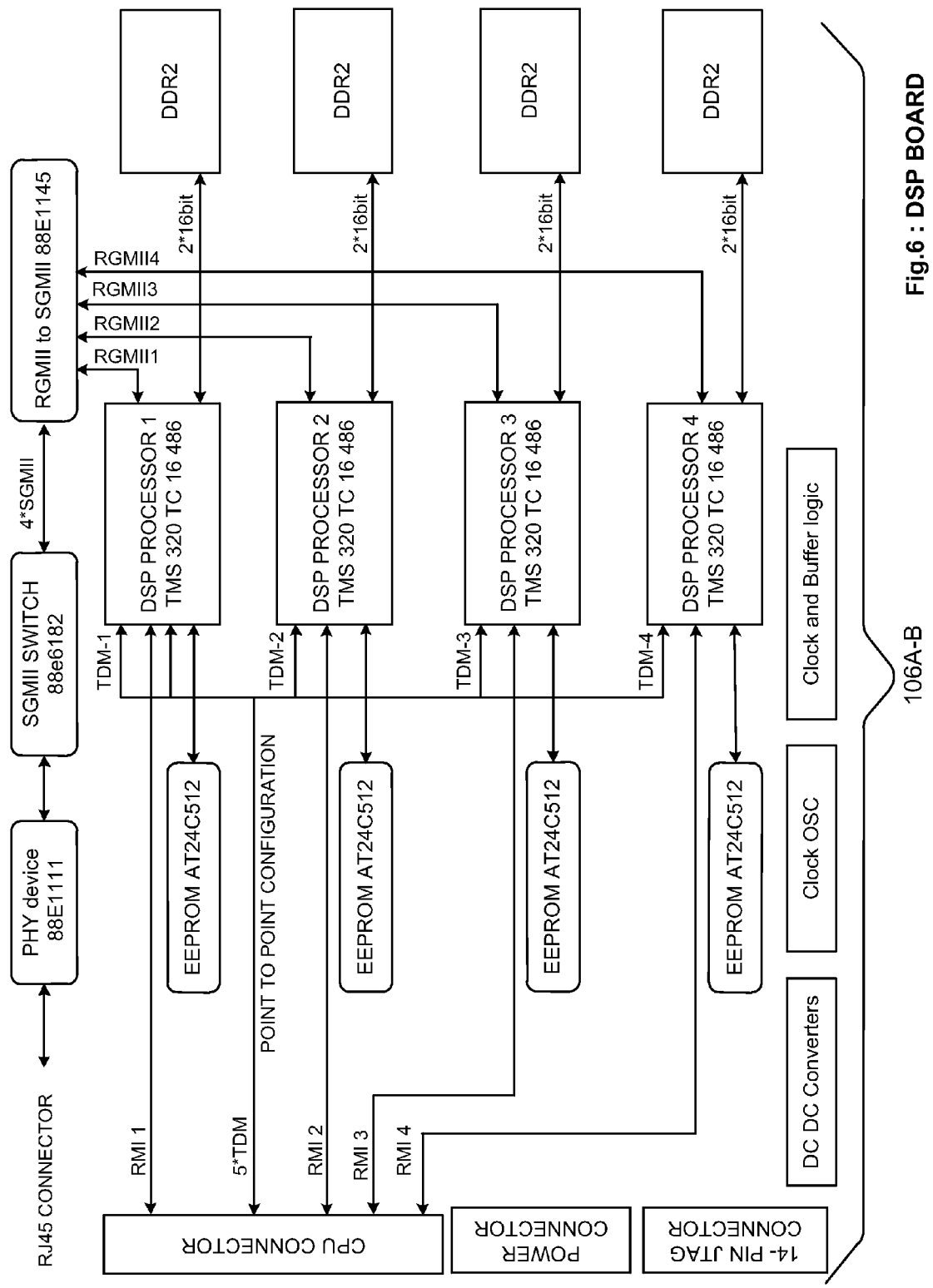
Fig.6 : DSP BOARD

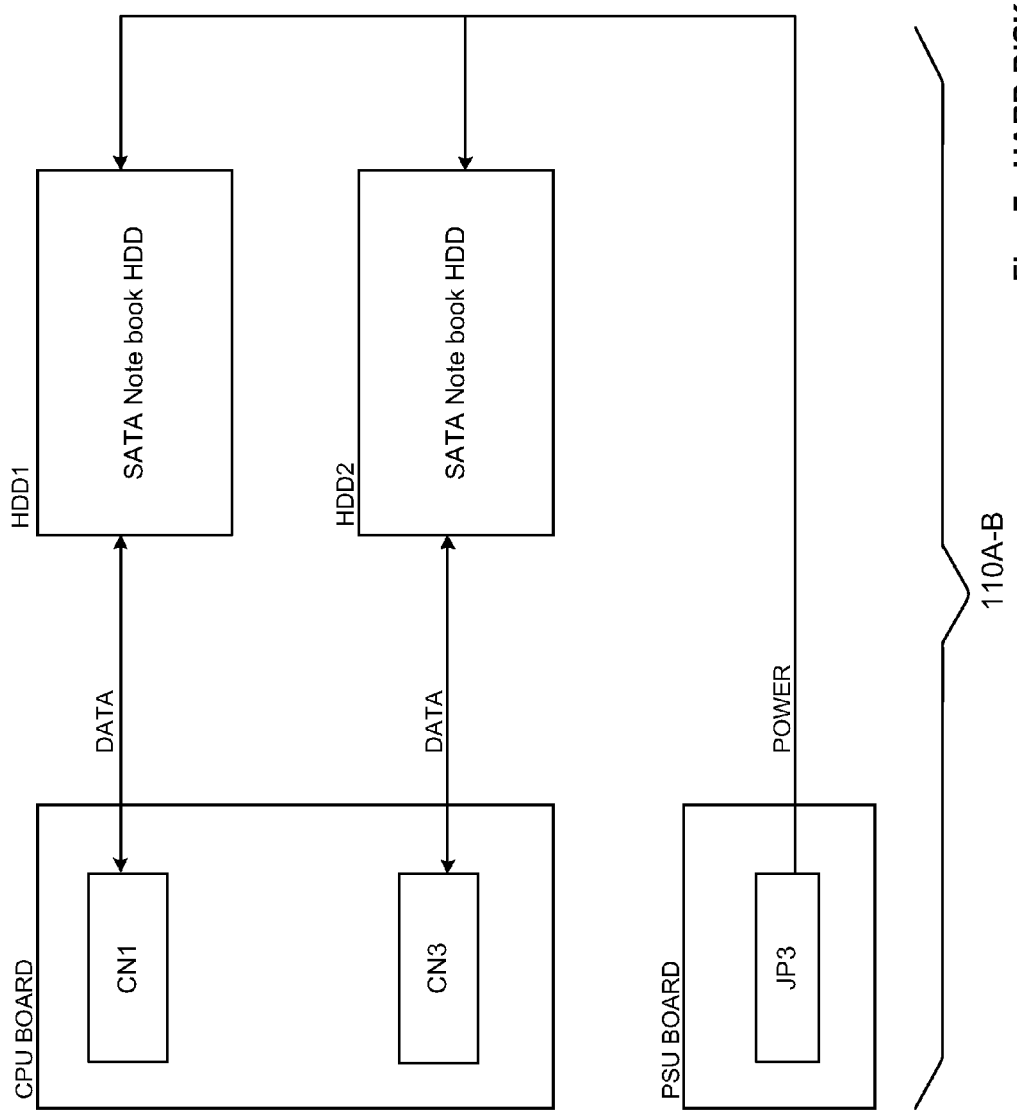
Fig. 7 : HARD DISK DRIVE (HDD)

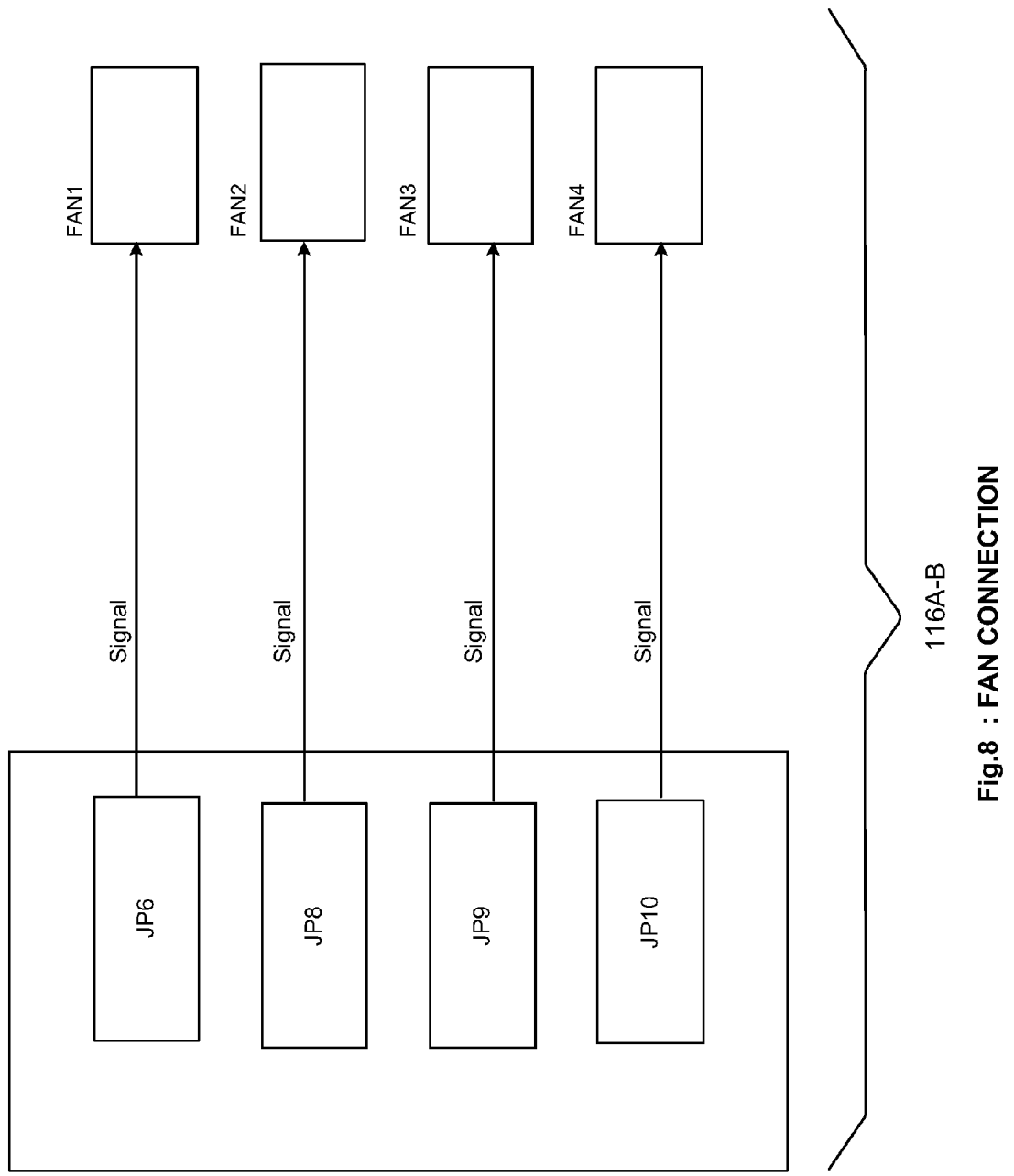
Fig.8 : FAN CONNECTION

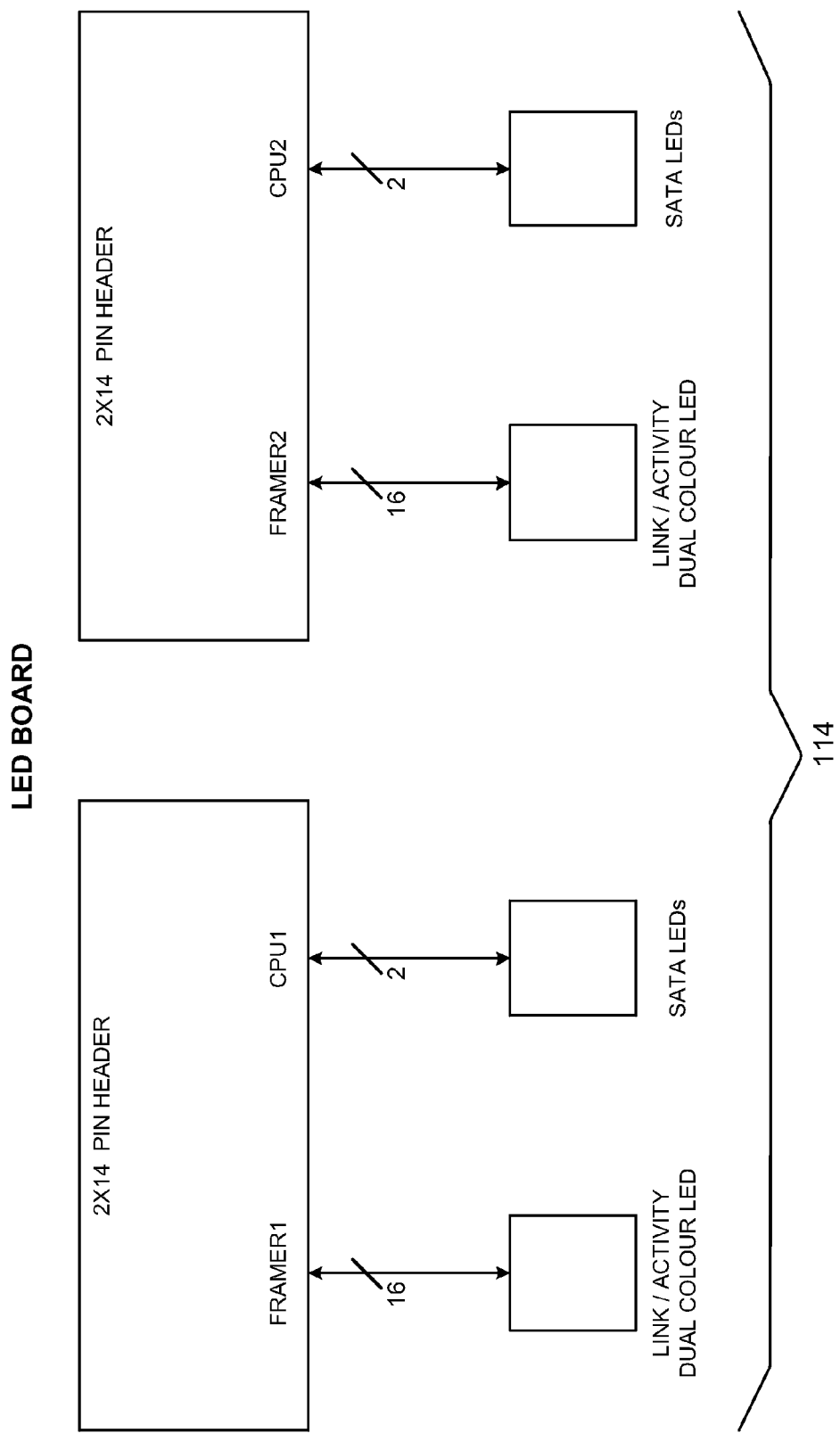
Fig.9 : LED BOARD

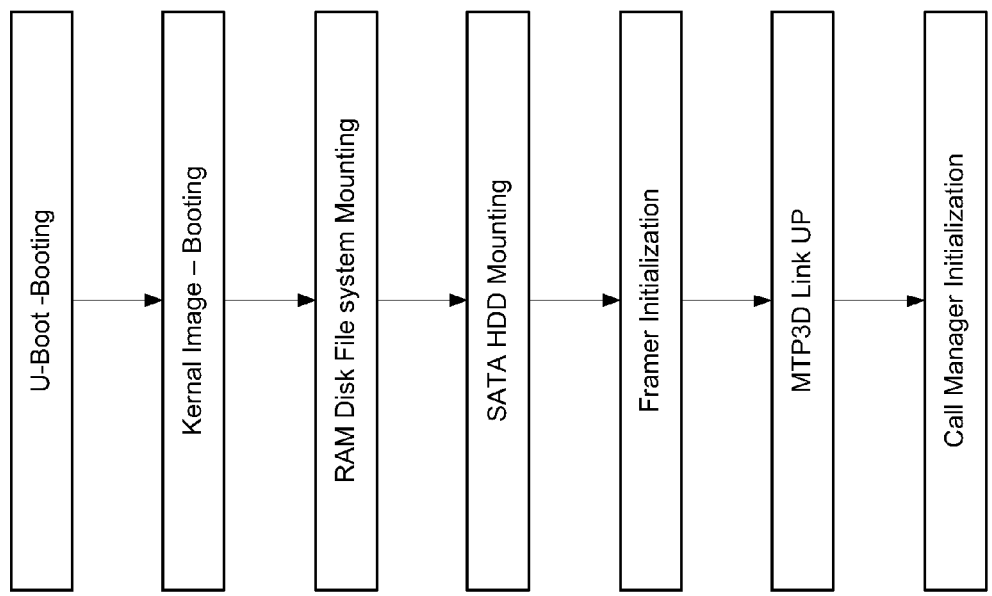
Fig.10 : Voice Call Services Configuration 1002

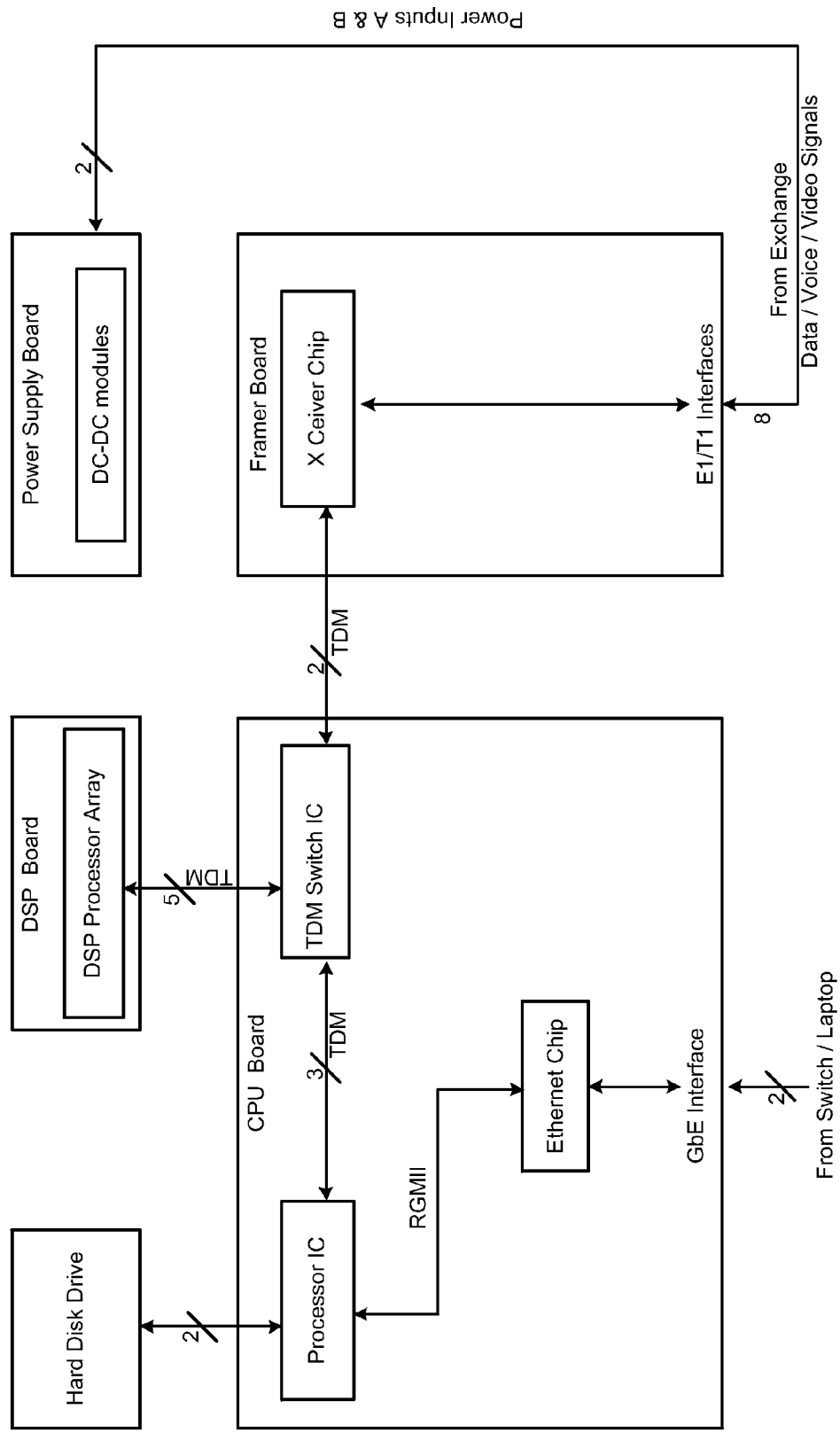
Fig.11 : FLOW CHART OF 16E/T1 MEDIA GATEWAY EQUIPMENT 1102

16E1/T1 MEDIA GATEWAY

FIELD OF TECHNOLOGY

This disclosure relates generally to a technical field of hardware based solution for the wire line, and wireless telecommunication technology and, in one example embodiment, to a 16E1/T1 media gateway.

BACKGROUND

In wire line and wireless telecommunication technologies, Value added service providers used to buy a general purpose computer server, a daughter card (e.g., the e1/t1 line interface card), to provide power back up infrastructure at the operator premises, to get license to provide services (e.g., OBD, IBD, SMSC, CRBT, etc.) may be very lengthy, time consuming, and varying from time to time. Then the servers, and daughter cards needs to be integrated for installation, and configure them for respective requested services like SMSC, USSD for DATA based services, like OBD, IBD, CRBT for Voice based services. As the number of E/T1 capability increases, the signal processing capability of the server based solution for telecom applications also needs to be improved, that leads the complexity in providing services.

In addition, the system may be lacking to support different protocols simultaneously (e.g., SS7, ISDN PRI, etc.,) and different applications in data domain (e.g., SMSC, USSD, in voice domain like IVRS, OBD, IBD, CRBT, etc.,) and the video (e.g., such as MMS, Video IVRS, etc.,).

On the other hand, the system lacking to provide more physical space for increased number of E1/T1 lines, good power facility with required backup provisions and time to implement the functionality, put the service providers with huge difficulties, mainly restricting them to go with limited setup at each place of operation. the computer servers are improving continuously in its basic configuration and interface options, especially in the line card interface side where the technology is drastically varied from PCI to PCI-X to PCIe Technology. While the line card designers not able to meet the same pace as with of server giants and they were not supporting immediately from PCI to PCI-X to PCIe.

SUMMARY

An apparatus, method and system of a 16E1/T1 media gateway are disclosed. In one aspect, a 16E1/T1 media gateway includes two set of 8E1/T1 interfaces connected through RJ45 connectors to create 16 E1/T1 interfaces in a media gateway equipment to run a multiple applications (Data/Voice/video) simultaneously in a single hardware based solution. Each 8E1/T1 set has a CPU board, Framer Board, DSP board, PSU board and one Hard Disk Drive. The CPU board has a high end communication processor with its unique interfaces is a custom designed board used to perform a specific type of data transformation from one form to another form, controlling all the connected devices. On one side this CPU board is connected to a custom designed framer board that may perform a specific function of a multiplexing, and de-multiplexing the channel data input available onto its E1/T1 interface. On other end, the CPU board is connected to a custom designed DSP board to perform the special functionalities related to video based services. The required power input to these CPU board, Framer Board and DSP board are provided by the Power Supply Board which generates 3.3VDC, 5VDC and 12VDC. The power supply board is powered by using two −48VDC inputs to supply the power simultaneously and to provide power redundancy during failure of power supply. The Power supply boards are designed to provide power to a maximum of 4 fans which are mounted in the system for cooling purpose.

A LED board is connected to the 16E1/T1 Media Gateway System to provide the E1/T1 SPAN status and HDD status information of the two 8E1/T1 Sets to the front side of the equipment.

The 16E1/T1 media gateway may be an embedded solution with a highly efficient digital signal processor to provide multiple applications to run simultaneously such as voice services such as voice dialers including OBD, IBD, CRBT, IVRS, and video services such as Video IVRS, Video dialing, 3G services, and Data services such as SMSC, USSD, SIP terminal, and other special services like WAP, LBS services, remote monitoring, GSM A interface value added services.

The CPU board may include a high end communication processor, a NOR flash IC, DDR2 SDRAM memory, NAND memory, a dual port Ethernet PHY, a TSI/TDM switch, a dual SATA bridge, internal DC-DC converters, and crystal oscillators to perform basic functionalities including the controlling the entire system and application services. The framer board may include a transceiver, protection circuits, a voltage regulator, and crystal oscillators to perform multiplexing, and de-multiplexing of the channel data input received from at least one of a 8E1/T1 interface, and CPU board. The DSP board may include 12C EPROM flash IC, DDR2 SDRAM memory, Ethernet device, internel DC-DC converter, and crystal oscillator to perform video related transcoding functions and transrating functions. The CPU board controls both the Framer board and the DSP Board.

In another aspect, a method includes developing plurality of 8E1/T1 signal line interface, and incorporating two 8E1/T1 signal line interface to double the capacity of the device to a 16E1/T1 interface per server, converting a channel data input in required format for one type of a network to another type of network, handling them to run simultaneously, and storing media by using a Hard Disk Drive (HDD).

The method also includes receiving of channel data by the Framer board and transferring them to the CPU board in the required format for processing them. For Data and Voice services, the CPU board itself does the required functional operation and for Video service, it sends the channel data to the DSP board for further processing of either transcoding or transrating. Then the processed data is either sent to the IP network through its GbE interface or again sent to the framer board to reach its E1/T1 interface. In addition, the method includes providing a power supply distribution to different boards, and providing a E1/T1 Span status and HDD status information to the front side of a equipment done through a LED board.

In yet another aspect, a system includes coder and decoder module that convert channel information for a required format from one type of a network to another type of network by a channel bank using a 8E1/T1 media gate way. Also the processor module handles the channel information to run simultaneously for different services by a CPU (full form) board having a high end communication processor, and storage module may store the media type information by using Hard Disk Drive (HDD).

The apparatuses, methods, and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 1 is a system view of a 16E1/T1 media gateway, according to one embodiment.

FIG. 2B illustrates the Fan provision, and LED board status display provision provided in the front panel, according to one embodiment.

FIG. 3 illustrates a power supply unit which supplies the power to 8E1/T1 set up, according to one embodiment.

FIG. 4 illustrates a CPU board, and functionalities, according to one embodiment.

FIG. 5 illustrates a framer board, and functionalities, according to one embodiment.

FIG. 6 illustrates a DSP board, and functionalities, according to one embodiment.

FIG. 7 illustrates Hard Disk Drive (HDD), and the connections, according to one embodiment.

FIG. 8 illustrates fan connections to the system, according to one embodiment.

FIG. 9 illustrates a LED board in the system, according to one embodiment.

FIG. 10 is a flow chart of voice call service configuration, according to one embodiment.

FIG. 11 is a flow chart that illustrates the performing various range of application through 16E1/T1 media gateway equipment, according to one embodiment.

Figure 2A:
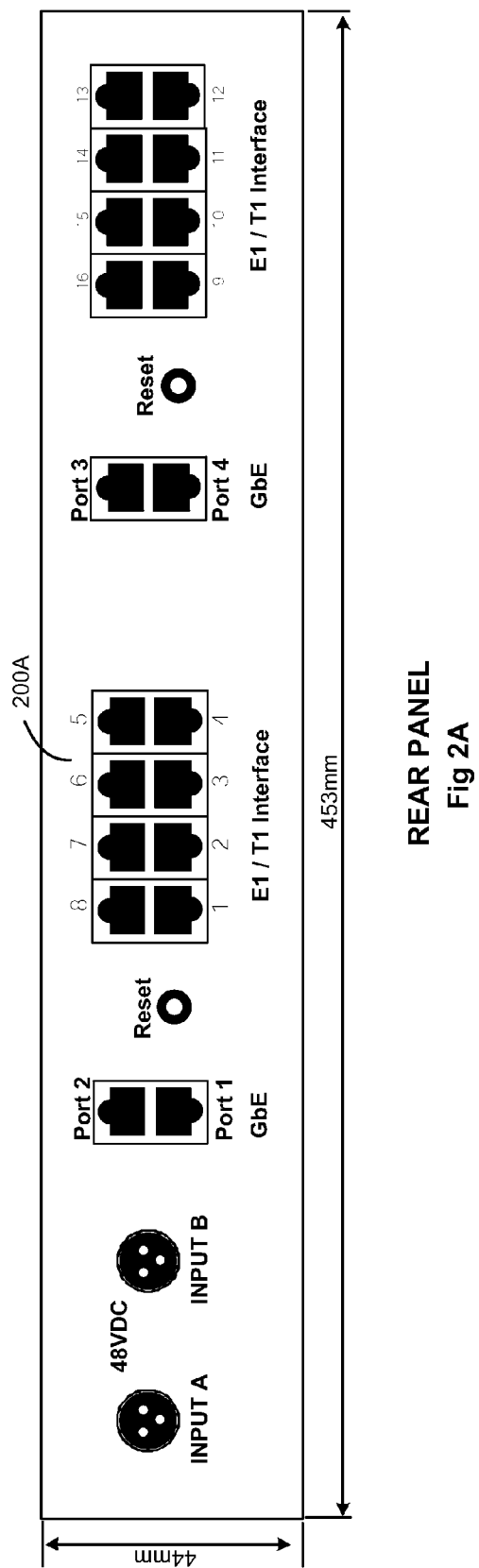
FIG. 2A illustrates a power input provided in a rear panel of the 16E1/T1 media gateway system.

Other features of the present embodiments will be apparent from the accompanying drawings and from the detailed description that follows.

DETAILED DESCRIPTION

An apparatus, methods, and system of a 16E1/T1 media gate way are disclosed. Although the present embodiments have been described with reference to specific example embodiments, it will be evident that various modifications and changes may be made to these embodiments without departing from the broader spirit and scope of the various embodiments.

FIG. 1 is a system view of a 16E1/T1 media gateway, according to one embodiment. Particularly, FIG. 1 illustrates a 8E1/T1 set up 102A-B, a CPU board 104A-B, a DSP board 106 A-B, a framer board 108A-B, a Hard Disk Drive (HDD) 110A-B, a PSU unit 112A-B, a LED board 114, Fans 116A-B, a power input 118, an E1/T1 interface 120A-B, and Gbe 122A-B, according to one embodiment.

The 8E1/T1 set up 102A-B may be a 8 port PCI card (line card/signaling card). There may be two set of 8E1/T1 to create 16E1/T1 media gate way equipment which is connected to a single server to run multiple applications simultaneously in a single hardware based solution. For example the multiple applications are voice services such as voice dialers including OBD, IBD, CRBT, IVRS, and video services such as Video IVRS, Video dialing, 3G services, and Data services such as SMSC, USSD, SIP terminal, and other special services like WAP, LBS services, remote monitoring, GSM A interface value added services.

The 16E1/T1 media gateway equipment consists of two 8E1/T1 interfaces, two power inputs with respective ON/OFF switches, four gigabit Ethernet interfaces, two Power Supply Units (PSU), two framer boards, two Central Processing Unit (CPU) boards, two Digital Signal Processor (DSP) boards, two computer storage devices (HDD), one LED board and six Fans.

Each 8E1/T1 set ups in the apparatus may include the CPU board (server), the framer board, the DSP board, PSU, and HDD. Two 8E1/T1 set up may be used for doubling the capacity of the apparatus from 8E1/T1 to 16E1/T1 media gateway, and configuring the 8E1/T1 ports to handle the data, voice, and video data in any desired combination. The inter board communication is provided between the two 8E1/T1 set up either externally with the available GbE interfaces or internally within the DSP boards.

In example embodiment, two 8E1/T1 set up 102A-B is connected through a octal RJ45 connectors provided on the framer board 108A-B to create 16E1/T1 port in the media gateway system. The 8E1/T1 set up 102A-B includes the CPU board (server), the framer board, the DSP board, PSU, and HDD which may be connected each other in the media gateway equipment to run multiple applications simultaneously.

FIG. 2A illustrates a power input provided in a rear panel 200 of the 16E1/T1 media gateway system, according to one embodiment. The two power input source (e.g., −48VDC Input A & −48VDC Input B) connects to the two Power Supply Units (PSU) 112A-B of the system through its respective ON/OFF switches on the front panel. The Power Inputs are provided in the rear panel 200 of the 16E1/T1 media gateway system using a 3pin Gillard connector while the switches are available in the front panel. FIG. 2B illustrates the Fan 116A-B provision, and LED board 114 status display provision provided in the front panel 200 B, according to one embodiment. In the front panel 200B two ON-OFF switches may be provided which is connected to the two −48VDC power inputs.

FIG. 3 illustrates a power supply unit (PSU) 112A-B which supplies the power to 8E1/T1 set up 102A-B, according to one embodiment. In FIG. 3 the voltage (e.g., −48V input A &B) from the header may be taken parallel, and is given as input to the DC-DC converter modules, which may be responsible for converting into the required voltages (e.g., 3.3VDC, 5VDC, and 12VD). These low voltage outputs are given to different boards through different header and/or connectors such as the 3.3VDC, and 5VDC generated from the Power Supply Unit (PSU) 112A-B is used to power up the CPU board, the 3.3VDC, 5VDC, and 12VDC is used to power up the DSP board, The 5VDC, and 12VDC is used to power up the HDDs, and The 12VDC is used to run the Fans mounted in the cabinet.

The two −48VDC input is to give input redundancy to the system. As both the inputs are taken parallel, it may appear as single supply for the DC-DC converter modules which convert the inputs to the required output voltages. That may be enough if one is connected for the proper operation of the system. When both the inputs are connected, each input will share the current and hence power sharing is achieved. For any situation, any of the inputs failed, without any disturbance, the second input may take over the full load and operate.

In example embodiment, there may be two Power Supply Unit (PSU) 112A-B connected to each 8E1/T1 set up 102A-B for power supply.

FIG. 4 illustrates a CPU board, and functionalities, according to one embodiment. Particularly, FIG. 4 illustrates the structure of Central Processing Board (CPU) 104A-B which has an embedded specific, high end communication processor. The CPU board 104A-B may be custom-designed board is capable of controlling all the devices connected to it and performing a specific functions (e.g., data transformation from one form to another like IP-IP transformation and IP-TDM transformation) for services and signaling. In addition to this, for applications such as Video IVRS and 3G Video applications, the CPU board 104A-B takes the additional responsibility of transferring the data to the DSP board 106A-B, and controlling the DSP board 106A-B. The processor carries out the defined instructions, processes, and delivers the resultant as services. Instructions are given to the processor in a form of program and the data for processing is given through different interfaces (e.g., TDM interfaces, Ethernet interfaces, Local bus interfaces, and PCI interfaces) provided in the system.

A high end communication processor is available in the CPU board which may be the heart of the system to perform activities like manipulating the data, and controlling all the devices connected to it. The CPU board having a NOR flash IC where boot information is stored. A DDR2 SDRAM memory to increase the data manipulation capability upto 2 GB. A NAND memory to increase the media storage capability within the board interms upto 256 MB. A Dual port Ethernet PHY to connect GbE interface with the processor, A TSI/TDM switch to switch multiple TDM data's between those received through different sources and the processor and to generate required clock & frame signals. A dual SATA bridge to extent the storage capacity using a HDD, internal DC-DC converters to generate the required low voltages like 1.2V, 1.8V, 2.5V etc. Crystal oscillators to generate the necessary clocking signals and/or frequency for the processor, and other devices to operate. The Power supply Board powers the CPU board with 3.3VDC and 5VDC.

FIG. 5 illustrates a framer board, and functionalities, according to one embodiment. In particular, FIG. 5 explains the framer board 108A-B which may be custom-designed board is capable of performing a specific function of multiplexing and de-multiplexing of the PCM data, signaling data, and data link data onto the E1/T1 line. A maximum of 8E1/T1 lines may be connected through the octal RJ45 connectors provided. The Framer board 108A-B consist of an octal Transceiver IC to transmit and receive the E1/T1 line data in one end and in the other end, to a multiplex and de-multiplex, the serial data streams. In addition, it also takes the responsibility of synchronizing with the start of the frame and extract the data link, signaling, CRC, PCM data from the received serial bit streams and clocking them at E1/T1 clock rates. Protection circuits comprising of fuse & diode to protect the complete board from the spurious disturbance received in the E1/T1 line. A voltage regulator may generate the required low voltages (e.g., 1.8V.). Crystal oscillators may generate the necessary clocking signals and/or frequency. The framer board 108A-B also processes the data input from the CPU board 104A-B, and making such data available to the E1/T1 interface in the required format. The CPU board powers the Framer board through the connector used to connect it and supplies 3.3VDC.

In example embodiment, there may be two framer board 108A-B connected to each 8E1/T1 set up.

FIG. 6 illustrates a DSP board 106A-B, and functionalities, according to one embodiment. The two DSP board 106A-B connected to the device may take the load of all video related transcoding functionalities such as conversion of H.263 QCIF to H.263 QCIF or H.263 QCIF to H.264 QCIF formats and transrating functionalities like conversion from 15 fps to 8 fps, along with voice and delivers the required services to the user. The DSP board consist of a communication infrastructure Digital Signal processor to perform voice over packetising targeting telephony infrastructure applications, including voice/video over packet high density and medium density gateways, wireless media gateways and remote access servers. Around four processors may be used on each DSP board 106A-B to provide at a maximum of 40 to 50% video load. I2C EPROM flash IC where boot information is stored. DDR2 SDRAM memory used to increase the data manipulation capability. Ethernet devices may provide inter board communication between the two 8E1/T1 setup available in the system. Internal DC-DC converters may generate the required low voltages like 1.2V, 1.8V, 2.5V. Crystal oscillators to generate the necessary clocking signals and/or frequency for the processor and other devices to operate. The power supply board provides power input to the DSP board with 3.3VDC, 5VDC and 12VDC.

FIG. 7 illustrates Hard Disk Drive (HDD) 110A-B, and the connections, according to one embodiment. The media storage capabilities of the 16E1/T1 media gateway system may be achieved using a Hard Disk Drive (HDD) 110A-B. The operating system, required service application software, data, voice, and video files to be played, the transfer information and other details are stored in the HDD. All informations, details are either installed or stored in the HDD 110A-B through the SATA interface provided in the CPU board 104A-B. The required files supporting the application for data, voice, and Video services are also stored in the HDD 110A-B. Storing the files, retrieving them, updating and/or deleting may be done through the SATA interface provided in the CPU board 104A-B by using a SATA HDD drive. A maximum of two numbers of SATA HDD's may be connected to the system. The power supply board supplies the power to the HDD 5VDC and 12VDC while the CPU board takes care of the data signals communicated to the HDD.

FIG. 8 illustrates fan connections 116A-B to the system, according to one embodiment. A chassis fan and/or a case mount is any fan inside a cabinet used for cooling purposes, and may refer to fans that draw cooler air into the case from the outside, expel warm air from inside, and/or move air across a heatsink to cool a particular component. The amount of airflow which fans generate may be measured in cubic feet per minute (CFM), and the speed of rotation is measured in revolutions per minute (RPM). The fan 116A-B may have a higher CFM rating, but produce less noise (measured in decibels, or dB).

The system may be equipped with six such fans 116A-B to maintain full air circulation and proper operating temperature inside it. The power inputs to the fans may be provided directly from the PSU board 12VDC, and each PSU board 112A-B has the provision to power up to four fans. The Fans gets turned ON immediately when the system is powered up.

In example embodiment, FIG. 8 illustrates the fan connection 116A-B, and there may be around six fans connected to the system. Each PSU board 112A-B may have the provision to power up to four fans.

FIG. 9 illustrates a LED board 114 in the system, according to one embodiment. There may be multiple LED's 114, and each displaying a specific status. All LED's 114 may be controlled by software which depends on whether the system is booting or not. The HDD 110A-B status is taken from the CPU boards 104A-B and the E1/T1 Line and/or SPAN status may be taken from the Framer boards 108A-B.

The LED board 144 is a simple board which is used to show the 16 E1/T1 line status or otherwise called as SPAN status and the HDD status in the front panel of the system.

FIG. 10 is a flow chart of voice call service configuration 1002, according to one embodiment. Particularly, FIG. 10 shows the flow of voice call service configuration starts from U-Boot-Booting, Kernel Image-Booting, RamDisk File System Mounting, SATA HDD Mounting, Framer Initialisation, MTP3D Link UP, and Call Manager Initialisation.

FIG. 11 is a flow chart that illustrates various range of application performing through the CPU board, framer board, DSP board, and HDD using Power Supply Board in the 16E1/T1 media gateway equipment 1102, according to one embodiment.

In one embodiment, the boards are fixed in a metal cabinet (e.g., which is of 1 U height) and can be mounted on a 19" server racks available in the telecom exchanges. A Telecom exchange provides −48VDC power and E1/T1 signaling lines to this system. These are to be plugged into the designated slot provided in the rear panel of the equipment and/or system as shown in FIG. 2.

By connecting the −48VDC power input to the connectors provided in the rear panel, and switch ON the system using the switch provided in the front panel. Once the system is switched on, Power supply units may be activated and −48 VDC power is converted to the respective output voltages such as 3.3V, 5V, 12V and supplied to the designated boards. The CPU Power connector in the CPU board will get 3.3VDC, and 5VDC generated from the Power Supply Unit and the CPU board gets turned ON and started booting. The HDD power connector may get the 5VDC and 12VDC generated from the Power Supply Unit and turns ON the HDD. The 12VDC is available in the FAN connectors on the Power Supply board and the FANS are activated. The DSP power connector may get the 3.3V, 5V and 12V generated from the Power Supply unit.

System Booting—the High End Communication processor available in the CPU board is booted with the boot information stored in the Flash IC (of the CPU board). Once Uboot is booted, this may inturn trigger Kernel Image to load into the system. Then RamDisk File system is mounted through software automatically, which inturn initiates the SATA HDD mounting. An Ethernet cable (e.g., cross type) is connected to one of the GbE connector and the other end is connected to a laptop. Set the IP for the system, in accordance with the IP available at the switching centre. Remove the laptop and the Ethernet cable connected to the system. Now there are two options are available to configure the system and to initiate the services. It is On Field Setup Configuration Procedure and Remote Login Setup Configuration Procedure.

On Field Setup Configuration Procedure—by connecting the GbE connector of the system with a cross type Ethernet cable with the laptop. (Leave this step, if it is already connected). Initiate the framer. Configure the SS7.conf file. Configure the extensions.conf. Initiate the mtp3d. Upon initialisation, the SPAN status LED will glow RED in colour. This may be visualised in both the rear panel (in the RJ45 connector provided for E1/T1 interface) and in the front panel. Connect the E1/T1 line provided at the exchange in the RJ45 connector in the rear panel. A healthy E1/T1 line may make the corresponding SPAN status LED to glow GREEN. This is again visualized both in rear and front panels. Initiate the Appropriate services ie., like Outbound dial services, CRBT etc., by initiating its application and Call Manager. Now the system is under function. Remove the laptop and the Ethernet Cable connected to the system.

Remote login Setup configuration Procedure—Login remotely into this system either through ftp or telnet method. Initiate the framer. Configure the SS7.conf file. Configure the extensions.conf. Initiate the mtp3d. Upon initialisation, the SPAN status LED will glow RED in colour. This may be visualised in both the rear panel (in the RJ45 connector provided for E1/T1 interface) and in the front panel. Connect the E1/T1 line provided at the exchange in the RJ45 connector in the rear panel. A healthy E1/T1 line will make the corresponding SPAN status LED to glow GREEN. This is again visualized both in rear and front panels. Initiate the Appropriate services ie., like Outbound dial services, CRBT etc., by initiating its application and Call Manager. Now the system is under function. Logout from the system. Now the system is under working condition and/or functioning perfectly for the services.

In one or more embodiment, the disclosure relates to flexibility to increase the number of E1/T1 line interface upto 16 using a single unit, having provision to increase further more to meet the demand from the telecom operator for either different applications or for higher number of E1/T1, efficient signaling handling capacity of the processor, less power consumption as it is operated in DC power source which are the generally available one at Telecom operator premises, mountable in a commercially available 19" Server racks, there by considerably reducing the space occupancy for 16E1/T1 capacity, cost effective as power back up provision at the telecom operator premises is not at all required, less space occupancy, less power consumptions, and easy to manage, if further more such units are used at the same place.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the 8E1/T1 set up 102A-B comprises of, the CPU board 104A-B, the DSP board 106 A-B, the framer board 108A-B, the Hard Disk Drive (HDD) 110A-B, the PSU unit 112A-B, a LED board 114, Fans 116A-B, the 8E1/T1 interface 120A-B, and 2 Gbe 122A-B of FIG. 1-11 may be enabled using software and/or using transistors, logic gates, and electrical circuits (e.g., application specific integrated ASIC circuitry) such as a write ordering circuit, a storage circuit, an observation circuit, a processing circuit, a analysis circuit, a substitution circuit, a setting circuit, an association circuit, a sequence circuit, a collation circuit, a retrieval circuit, an interface circuit, a monitor circuit, a identifier circuit, a write circuit, a comparison circuit, a assembly circuit, a synchronization circuit and/or other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A 16 E1/T1 media gateway comprising:
   at least two set of 8E1/T1 interfaces connected through connectors to create 16 E1/T1 interface in a media gateway equipment to run plurality of applications in a single hardware based solutions;
   at least two set of CPU (Central Processing Unit) board with an high end communication processor through different interfaces are to perform a specific data transformation from one form to another form;
   at least two set of a framer board is a custom-designed board connected to each CPU board to perform a specific function of a multiplexing, and de-multiplexing a data input onto its E1/T1 interface;
   at least two DSP (Digital Signal Processor) boards connected to the an equipment;
   at least two Hard Disk Drive (HDD) connected to each 8E1/T1 interface used for media storage, and wherein the HDD is a computer storage device;
   at least two PSU (Power Supply Unit) are available and each is powered by using at least two power inputs to supply power simultaneously to the PSU, and to provide power redundancy to the PSU during failure of power supply from at least one input is connected to a dual input header;
   a LED board connected to the media gate way to provide both a SPAN status, and HDD status information of both the two 8E1/T1 set up to a front side of the equipment; and
   at least six fans are connected to a device for cooling purpose.

2. The 16 E1/T1 media gateway of claim 1 wherein the media gateway is an embedded solution with a highly efficient digital signal processor to provide plurality of applications to run simultaneously voice services such as voice dialers including OBD, IBD, CRBT, IVRS, and video services such as Video IVRS, VIDEO DIALING, 3G services, and Data services such as SMSC, USSD, SIP terminal, and other special services like WAP, LBS services, remote monitoring, GSM A interface value added services.

3. The 16E1/T1 media gateway of claim 1 wherein the set of CPU board comprises a high end communication processor, a NOR flash IC, DDR2 SDRAM memory, NAND memory, a dual port Ethernet PHY, a TSI/TDM switch, a dual SATA bridge, internal DC-DC converters, and crystal oscillators to perform data transformation.

4. The 16E1/T1 media gateway of claim 1 wherein the framer board consists of a transceiver, protection circuits, a voltage regulator, and crystal oscillator to perform multiplexing, and de-multiplexing of the data input received from at least one of a 81/T1 interface, and CPU board.

5. The 16E1/T1 media gateway of claim 1 wherein the DSP board comprises plurality of 12C EPROM flash IC, DDR2 SDRAM memory, Ethernet device, internet DC-Dc converter, and crystal oscillator to perform video related transcoding functions.

6. A method comprising:
   Providing power supply distribution to different boards, and fans through power supply units;
   Developing plurality of 8E1/T1 signal line interface, and incorporating at least two 8E1/T1 signal line interface to double the capacity of the device to a 16E1/T1 interface per server;
   Converting a data input in required format for at least one type of a network to another type of network;
   Handling the data input to run simultaneously;
   Storing media by using Hard Disk Drive (HDD),
   providing status information to front side of a device through a LED board;
   processing the data input by a CPU board having at least one embedded, specific, and high end communication processor;
   transferring the data input to the CPU board in the required format; and
   processing the data input from the CPU board, and making the data input availability to the E1/T1 interface in the required format;
   wherein at least two CPU board connected to the 16E1/T1 media gateway system that are custom-designated configured to perform a specific data transformation from one form to another form; and wherein the added function of the CPU board to transfer the data to the DSP board, and to control the DSP board for video related services and transfer to a framer board and to control the framer board for voice/data related services.

7. The method of claim 6 wherein the power supply unit is powered by using at least two −48 VDC input to provide input redundancy to the system is connected to a dual input header.

8. The method of claim 6 wherein the data input is at least one of an audio, a video, a voice, a real time multipoint communication; and wherein the real time multipoint communication is a signaling session management handling simultaneously by the 16E1/T1 media gateway.

* * * * *